(12) United States Patent
Achtner et al.

(10) Patent No.: US 9,714,676 B2
(45) Date of Patent: *Jul. 25, 2017

(54) HOLE-FILLING SLEEVE AND WASHER DESIGN FOR BOLT INSTALLATION

(71) Applicant: THE BOEING COMPANY, Chicago, IL (US)

(72) Inventors: Gerfried R. Achtner, Mukilteo, WA (US); Thomas D. Hall, Everett, WA (US); Ryan M. Mahn, Lake Stevens, WA (US); Javier Manriquez, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 308 days.

This patent is subject to a terminal disclaimer.

(21) Appl. No.: 14/454,161

(22) Filed: Aug. 7, 2014

(65) Prior Publication Data

US 2016/0040709 A1 Feb. 11, 2016

(51) Int. Cl.
*F16B 43/00* (2006.01)
*B23P 19/06* (2006.01)
(Continued)

(52) U.S. Cl.
CPC ............. *F16B 43/00* (2013.01); *B23P 19/06* (2013.01); *B64D 45/02* (2013.01); *F16B 19/02* (2013.01); *F16B 5/02* (2013.01)

(58) Field of Classification Search
CPC ........... F16B 43/00; F16B 19/02; B64D 45/02
(Continued)

(56) References Cited

U.S. PATENT DOCUMENTS

| 3,641,865 A | 2/1972 | Swindt et al. |
| 3,835,615 A | 9/1974 | King, Jr. |

(Continued)

FOREIGN PATENT DOCUMENTS

| DE | 102007026733 A1 | 12/2008 |
| FR | 1226676 A | 7/1960 |

(Continued)

OTHER PUBLICATIONS

International Search Report and Written Opinion for PCT Application No. PCT/US2015/027708 dated Jul. 8, 2015.
(Continued)

*Primary Examiner* — Gary Estremsky
(74) *Attorney, Agent, or Firm* — Marshall, Gerstein & Borun LLP

(57) ABSTRACT

A fastener assembly which includes a sleeve which includes a cylindrical construction having a first and second end portions and an outside diameter. The fastener assembly further includes a washer associated with the sleeve wherein the washer includes a body which defines a first side and an opposing second side and defines an opening which extends from the first side toward the second side. The opening defines a diameter greater than the outside diameter of the sleeve and the body defines a recess which has a diameter greater than the diameter of the opening wherein the recess extends from the second side toward the first side such that the recess and the opening are in communication with one another. A method for using this fastener assembly is also provided.

20 Claims, 4 Drawing Sheets

(51) Int. Cl.
*B64D 45/02* (2006.01)
*F16B 19/02* (2006.01)
*F16B 5/02* (2006.01)

(58) Field of Classification Search
USPC .......................................................... 411/531
See application file for complete search history.

(56) References Cited

U.S. PATENT DOCUMENTS

| | | | | |
|---|---|---|---|---|
| 4,435,112 | A | * | 3/1984 | Becker ...................... F16B 5/02 29/453 |
| 4,518,282 | A | * | 5/1985 | Wilcox ............... E21D 21/0086 405/302.1 |
| 4,867,461 | A | * | 9/1989 | Shimmell ............... F16J 15/061 277/593 |
| 5,682,678 | A | * | 11/1997 | Gallagher ................. F16B 5/01 29/402.15 |
| 6,328,513 | B1 | * | 12/2001 | Niwa .................... G10K 11/168 16/2.1 |
| 7,185,873 | B2 | * | 3/2007 | Suka ..................... F16F 1/3732 248/635 |
| 7,874,777 | B1 | * | 1/2011 | Howie, Jr. .............. F16B 5/025 403/408.1 |
| 2005/0013678 | A1 | | 1/2005 | Smith |
| 2008/0145179 | A1 | * | 6/2008 | Amann .................. F16B 17/006 411/378 |
| 2010/0124472 | A1 | | 5/2010 | Nguyen et al. |
| 2012/0152611 | A1 | | 6/2012 | Fisher et al. |
| 2013/0202450 | A1 | * | 8/2013 | Ivakitch .................. F16D 1/076 416/248 |
| 2014/0145427 | A1 | | 5/2014 | Callahan et al. |
| 2015/0377279 | A1 | * | 12/2015 | Tanner ................... B64D 45/02 29/525.02 |

FOREIGN PATENT DOCUMENTS

GB          1478462 A        6/1977
WO    WO-2011050040 A1      4/2011

OTHER PUBLICATIONS

International Preliminary Report on Patentability for PCT/US2015/027708 dated Feb. 7, 2017.

\* cited by examiner

HOLE-FILLING SLEEVE AND WASHER DESIGN FOR BOLT INSTALLATION

FIELD

This invention relates to fasteners and more particularly to fasteners that utilize a sleeve in providing hole filling connections between at least two elements that are being joined together by the fastener

BACKGROUND

Fasteners are utilized in joining at least two elements or components together in the process of assembling many items of manufacture. A number of items of manufacture are sensitive to an occurrence of sparking caused by electromagnetic effects to which the items may be exposed. Such items, in particular, are ones that are exposed to the environment and could be exposed to unfavorable weather conditions such as lightening. Those items that are exposed to lightening, for example, do not want to be subject to sparking induced by the electromagnetic effects. In the example of an aircraft, it is not desirable for the aircraft to experience sparking at fastener positions as a result of being exposed to these electromagnetic effects. Thus, to prevent unwanted sparking, secure electrical contacts need to be achieved by fasteners that connect two or more elements or components together in assembling the item of manufacture. Failure to make secure electrical connections between the materials being joined together by a fastener and the fastener will provide a condition where unwanted sparking may occur.

In the assembly of an item of manufacture such as an aircraft, there is a need for numerous fasteners to be used to join and secure a number of components together that comprise the aircraft. There is a need to not only provide safety in preventing unwanted sparks at the location of the fasteners joining elements and components together from electromagnetic effect but also a need to provide as much standardization in fastening together materials to make assembly easier and faster and additionally less costly in not having to carry more fastener components of varying size to address the fastening of a large number of connections of components which may have a wide variety of grip lengths or thickness of the stacks of the components being joined together.

SUMMARY

It is an object of the present invention to provide a fastener assembly which includes a sleeve which includes a cylindrical construction having a first and second end portions and an outside diameter. The fastener assembly further includes a washer associated with the sleeve wherein the washer includes a body which defines a first side and an opposing second side and defines an opening which extends from the first side toward the second side. The opening defines a diameter greater than the outside diameter of the sleeve and the body defines a recess which has a diameter greater than the diameter of the opening wherein the recess extends from the second side toward the first side such that the recess and the opening are in communication with one another.

It is another object of the present invention to provide a method for using a fastener assembly which includes the step inserting a first end portion of a sleeve into and through a first end of a hole, wherein the hole is defined by at least two elements to be joined together and extends through the at least two elements such that a first end of the first end portion of the sleeve is positioned outside of a second end of the hole. The method also includes the step of positioning a washer, wherein the washer comprises a body which defines a first side and an opposing second side and defines an opening which extends from the first side toward the second side, wherein the opening positioned at the first side defines a diameter greater than the outside diameter of the sleeve, wherein the body defines a recess which extends from the second side toward the first side, wherein a diameter of the recess is greater than the diameter of the opening and wherein the recess and the opening are in communication with one another, such that the first end portion of the sleeve extends through the opening and the recess of the washer with a first end of the first end portion of the sleeve positioned outside of the recess with the recess facing in a direction toward the first end of the sleeve.

The features, functions, and advantages that have been discussed can be achieved independently in various embodiments or may be combined in yet other embodiments further details of which can be seen with reference to the following description and drawings.

DESCRIPTION

Figure 1:
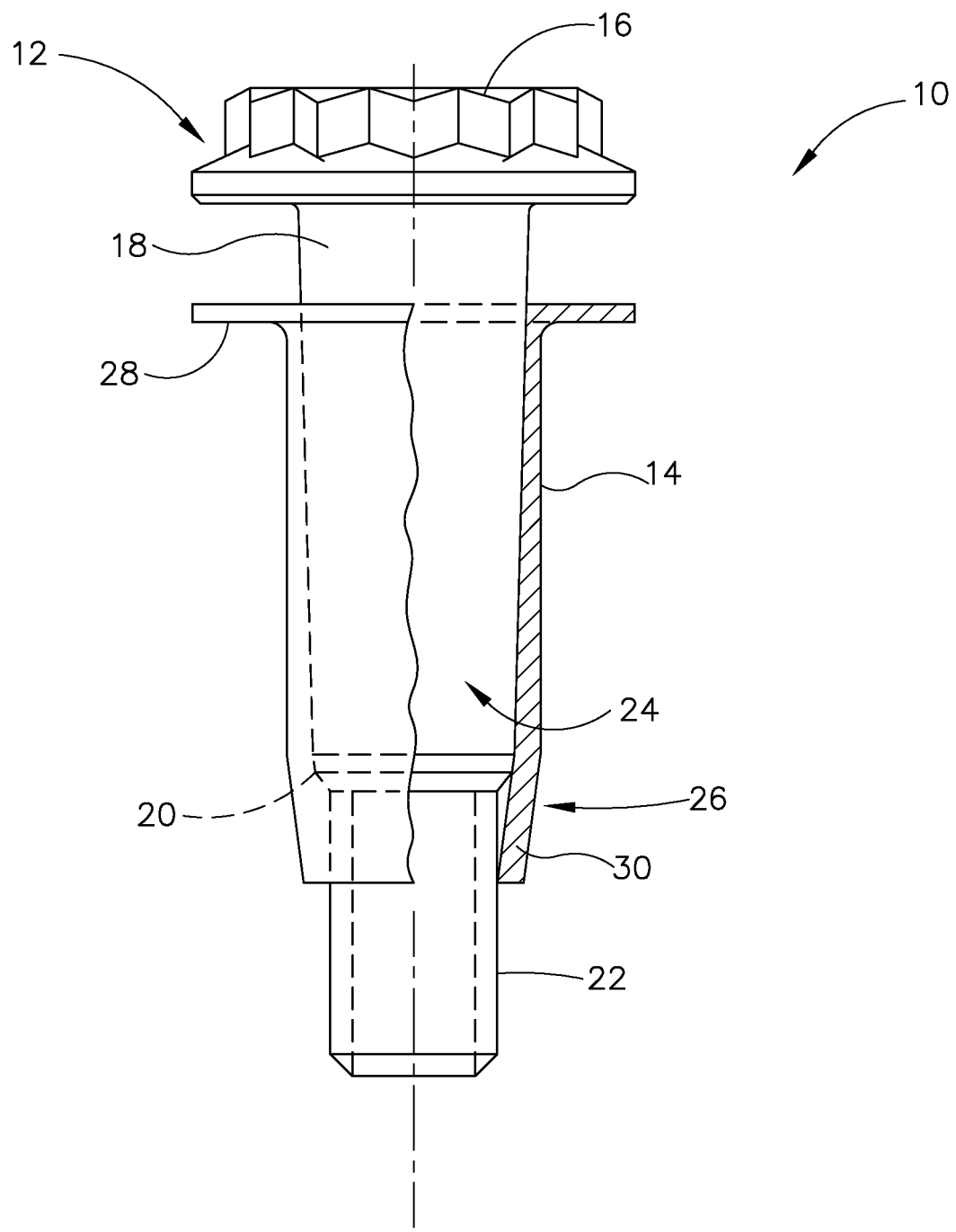
FIG. 1 is a partial cutaway view of a prior art fastener assembly which includes a tapered sleeve.

Referring to FIG. 1, an example of a prior art fastener assembly 10 is shown which is used to provide an interference fit with components it is joining together. This assembly utilizes a bolt member 12 selected to fit within a particular tapered sleeve 14. Bolt member 12 includes a head 16, central shaft 18, transition section 20 and threaded portion 22 (threads not shown). Tapered sleeve 14 defines an internal opening 24 wherein the opening 24 decreases in diameter in a lower section 26 of sleeve 14 and at an opposing end of sleeve 14 collar 28 is positioned surrounding sleeve 14. With tapered sleeve 14 inserted into a hole which has been drilled, reamed or otherwise positioned through at least two components to be joined together by fastener assembly 10, collar 28 is positioned to rest upon a surface of one of the components that are to be joined together. Collar 28 provides resistance of movement of sleeve 14 along the length of the hole in which it is inserted as bolt member 12 is tightened. Bolt member 12 is positioned inside of tapered sleeve 14 and penetrates tapered sleeve 14 as far as the opening 24 within tapered sleeve 14 permits central shaft 18 to travel within tapered sleeve 1. As seen in FIG. 1, the reduction of the opening 24 dimension in lower section 26 causes wall 30 of sleeve 14 to interfere with further travel unforced travel of central shaft 18 within tapered sleeve 14.

With bolt member 12 and sleeve 14 inserted into the hole defined in the components to be joined together, bolt member 12 and sleeve 14 are positioned relative to one another, as shown in FIG. 1. A nut (not shown) is engaged onto threaded portion 22 (not shown) and tightened. As the nut is tightened, bolt member 12 moves moved toward the nut and central shaft 18 of bolt member 12 begins to push against wall 30 of lower section 26 of tapered sleeve 14. As further tightening of the nut occurs central shaft 18 moves toward the nut and pushes section 26 outwardly and against an interior surface of the hole of the components being joined together forming an interference fit with the components. The interference fit promotes electrical contact with the components being joined together to prevent sparking from electromagnetic effects.

It is also known that similar fastener assemblies such as fastener assembly 10 were employed which utilized a non-tapered or rather straight cylindrical sleeve. In that assembly, an oversized bolt member was inserted into the sleeve and with the application of force was applied to the bolt member pushing it through the sleeve, thereby pushing the wall of the sleeve in an outward direction creating an interference fit within the hole positioned in components being joined. In both instances of a tapered or non-tapered sleeve the bolt member pushed on the wall of the sleeve in a lateral or outward direction to make the sleeve create an interference fit with the components being joined.

In using both the tapered or non-tapered sleeve arrangements of the fasteners in the prior art, much attention needed to be made as to the tolerances of the diameter of the hole with respect to the sleeve size in order to obtain the needed interference fit. For example, for using a particular bolt member as the grip stack length increases the diameter of the hole has to increase so as to provide the dimensional needs for creating a proper interference fit with the fastener to avoid sparking from electromagnetic effects. For example, using a ¾ inch sleeve bolt at a grip length of 10-29 units (each unit a $\frac{1}{16}^{th}$ of an inch) the target hole diameter would need to be 0.8455 inches in contrast as the grip length increases to 61-90 units the target hole diameter would need to be 0.9235 inches in diameter so as to accommodate the proper interference fit. As larger diameter holes were called for, greater diameter dimension would be needed for both the bolt member and the sleeve to create the proper interference fit. Thus, selection of bolts and sleeves to be expanded by the bolt members was time consuming and necessitated a large variety of sizes of both sleeves and bolt members to accommodate the needed interference fit for different grip stack lengths to counter electromagnetic effects in assembling an item of manufacture.

Additionally, care and effort needed to be taken in selecting the proper sleeve length for making the proper connection for various grip lengths. If the sleeve length was too short, proper interference electrical connection would not be accomplished along the length of the hole. If the sleeve was too long additional washers would be needed to be added to accommodate the extra length of the sleeve and be able to make a secure connection. In some instances, the number of washers which were permitted to be stacked were often limited to two. Thus, as grip lengths varied in the assembling an item of manufacture a wide selection of sleeve lengths would need to be provided to accommodate the varying grip lengths.

The application of the fastener assemblies of the prior art required varying the hole diameter as the grip length varied to accommodate a fastener. This impacted the selection of bolt and sleeve sizes to be used to accomplish the needed interference fit. As can be readily understood, when assembling an item of manufacture that has many connections to be made in joining together components, varying grip stack dimensions will require more time in considering the proper dimensions of holes to create in the materials to be joined and correspondingly having available a wide variety of sleeves and bolts to accomplish the connections to provide the needed interference fit. All of these considerations contribute to more cost for assembling an item of manufacture.

Obtaining a proper interference fit even becomes more strategic when materials such as composites are introduced into the components that are to be joined together. Components that are to be joined together in assembling an item of manufacture may include all metal components, all composite materials or a combination of metal and composite materials. A secure and reliable interference fit with composite materials must assure good electrical contact is made with the carbon conductive fibers within the composite material.

Figure 2:
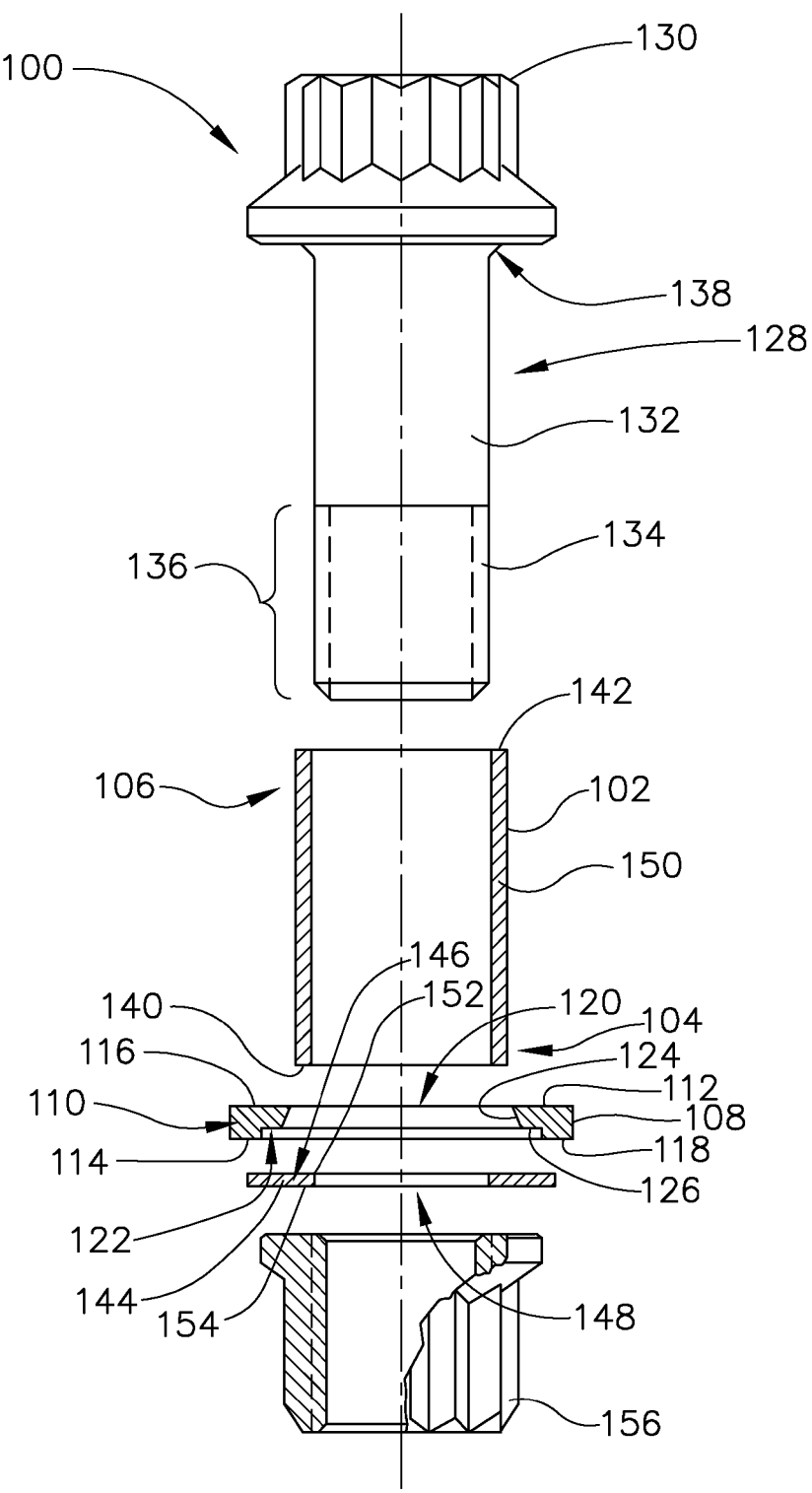
FIG. 2 is a partial cross sectional, cutaway and exploded front profile view of an embodiment of the fastener assembly of the present invention.

In referring to FIG. 2, an embodiment of fastener assembly 100 of the present invention is shown. Assembly 100 includes sleeve 102 which is configured or constructed in a cylindrical shape having a first end portion 104 and a second end portion 106. With its cylindrical shape, sleeve 102 has an outside diameter and correspondingly an interior diameter. Sleeve 102 is constructed of metal to provide strong connector, as are the other components of fastener assembly 100, and also to provide high quality electrical conductivity.

Washer 108, as will be described in more detail herein, receives and engages sleeve 102. Washer 108 has body 110 which defines a first side 112 and an opposing second side 114. First side 112 defines a flat annular surface 116 and second side 114 defines another flat annular surface 118. Body 110 defines an opening 120 which extends from first side 112 toward the second side 114. Opening 120 defines a diameter greater than the outside diameter of the sleeve 102. Body 110 of washer 108 defines a recess 122 which has a diameter greater than the diameter of opening 120 and which extends from the second side 114 toward the first side 112 such that recess 122 and opening 120 communicate with one another.

Opening 120 increases in diameter as opening 120 extends from first side 112 toward second side 114. As can be seen in FIG. 2, sidewall 124 which extends from first side 112 toward the second side 114 forms a planar surface and forms an acute angle with annular surface 116 of first side 112. Sidewall 124 extends to recess 122 whereat it intersects with flat annular surface 126 which surrounds opening 120 with which recess 122 communicates. As will be further discussed herein, diameter of opening 120 is greater than the outside diameter of sleeve 102 to allow sleeve 102 to pass through opening 120. Recess 122 has a diameter greater than opening 120 and of sleeve 102 wherein sleeve 102 can pass through recess 122.

Bolt member 128 includes head 130 and shaft 132. Shaft 132 has a diameter smaller than an inside diameter of the sleeve 102 and defines threads 134 (not shown) along a portion 136 of shaft 132. Transition portion 138 of shaft 132 extends from shaft 132 to head 130. Transition portion 138 of shaft 132 is configured to extend away from shaft 132 in a curved direction toward head 130.

Figure 3:
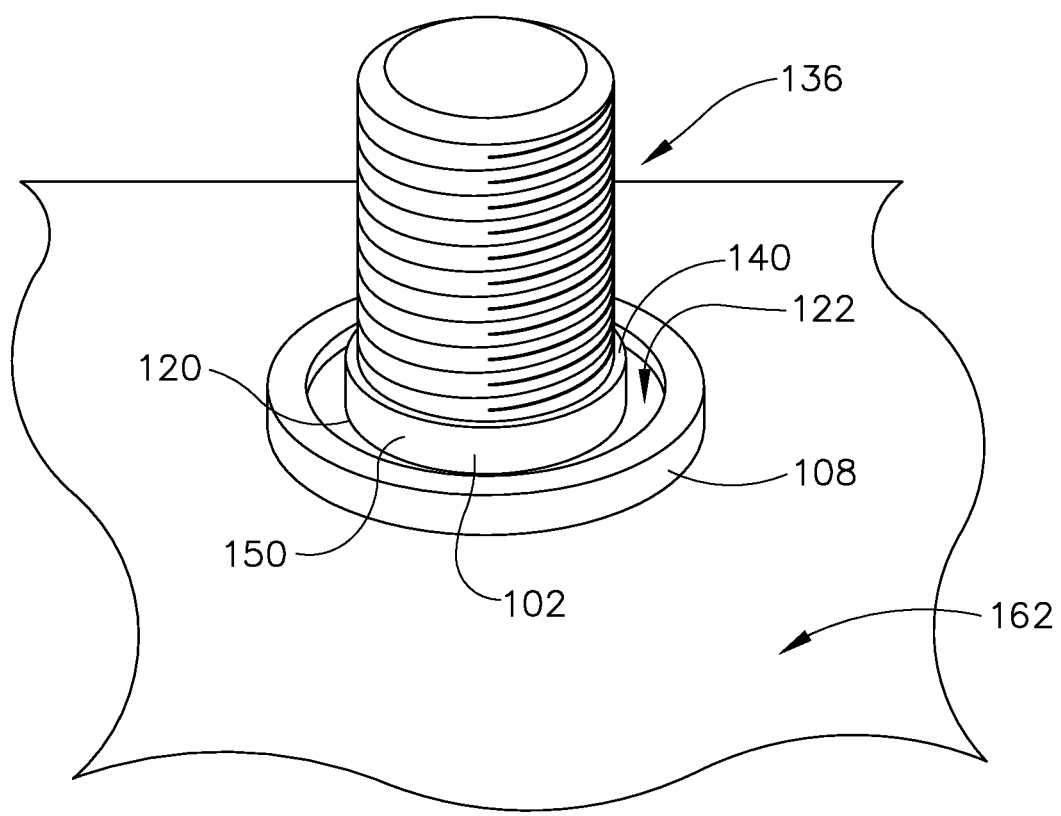
FIG. 3 is a perspective view of an embodiment of the fastener assembly positioned for joining two or more components together.
Figure 4:
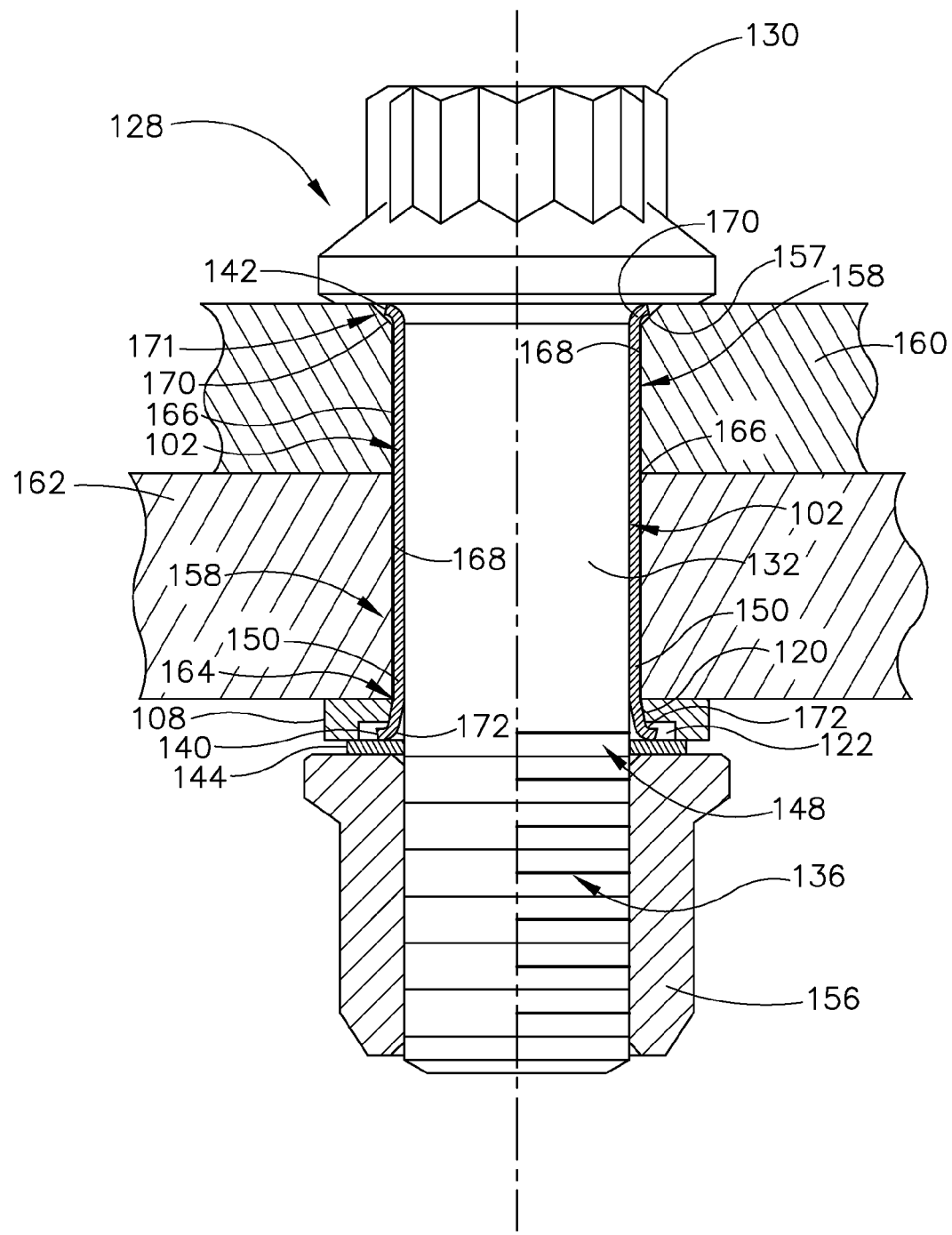
FIG. 4 is an assembled view of the fastener assembly of FIG. 2 with the fastener assembly securing two components together.

As shown in FIGS. 3 and 4, with shaft 132 of the bolt member 128 positioned within sleeve 102, at least a portion of portion 136 of the shaft 132 which defines threads (not shown) extends from first end 140 of first end portion 104 of the sleeve 102 and second end 142 of second end portion 106 of sleeve 102 is in contact with head 130 of the bolt member 128.

As seen in FIG. 2, another washer 144 is positioned to overlie washer 108. Another washer 144 includes a body 146 which defines an opening 148 through body 146 of other washer 144. In order for shaft 132 to be able to pass through other washer 144 opening 148 has a greater diameter than the diameter of shaft 132 of bolt member 128. However, the diameter of opening 148 is smaller than outside diameter of sleeve 102. This enables first end portion 104 of sleeve 102 to extend through opening 120 and recess 122 and beyond recess 122, as seen in FIG. 3, and position first end 140 of first end portion 104 of sleeve 102 to extend beyond recess 122 of washer 108. Shaft 132 of the bolt member 128 extends through opening 148 of other washer 144 with washer 108 positioned between other washer 144 and head 130 of bolt member 128. In this configuration and alignment, at least a portion of other washer 144 aligns with a wall 150 of the sleeve 102, as seen in FIGS. 2 and 4.

Body 146 of other washer 144 defines flat opposing annular surfaces 152 an 154 surrounding opening 148 of other washer 144. Outside diameter of other washer 144 is greater than the diameter of recess 122 of the washer 108, as can be seen in FIGS. 2 and 4. Thus, in this embodiment, other washer 144 is in alignment with wall 150 of sleeve 102 and extends over recess 122 with other washer 144 in overlying relationship with washer 108, as seen in FIG. 4.

Nut 156 which defines threads (not shown) compatible to the threads defined by shaft 132 of the bolt member 128. As seen in FIGS. 2 and 4, other washer 144 is positioned between washer 108 and nut 156 wherein the threads of nut 156 and bolt member 128 are compatible so as to engage one another.

In using fastener assembly 100, a first end portion 104 of sleeve 102 is inserted into and through a first end 157 of hole 158, as seen in FIG. 4. Hole 158 is defined by at least two components or elements 160 and 162 that are to be joined together. As mentioned herein, elements 160 and 162 can be constructed of a variety of materials such as metal and/or composite material. These elements can vary in number and in the grip length or stack height. Hole 158 is either positioned in components 160 and 162 by way of drilling, reaming or any other common process employed to provide holes through components. Hole 158 extends through the at least two elements 160 and 162, such that a first end 140 of the first end portion 104 of sleeve 102 is positioned outside of a second end 164 of hole 158. As can be appreciated, one needs to select a sleeve 102 with an outside diameter that is slightly smaller than the diameter of hole 158 and a length that is in excess of the length of hole 158.

As can be seen in FIGS. 3 and 4, washer 108 is positioned about sleeve 102 with recess 122 facing first end 140 of sleeve 102 such that first end 140 of sleeve 102 extends through opening 120 and recess 122 and is positioned outside and beyond recess 122, as shown in FIG. 3. Bolt member 128 is positioned to extend through sleeve 102 such that with second end 142 of sleeve 102 abutting head 130 at least a portion of a portion 136 which defines threads for shaft 132, as seen in FIGS. 3 and 4 extend beyond first end 140 of sleeve 102 and as seen in FIG. 3, extends beyond washer 108.

With sleeve 102 positioned to extend through hole 158, bolt member 128 extending through sleeve 102 and washer 108 positioned about sleeve 102, as shown in FIG. 3, other washer 144 is positioned onto shaft 132 to in overlying position with washer 108. Other washer 144 is in position to protect nut 156 from first end 140 of wall 150 of sleeve 102 as nut 156 is tightened. Threads of nut 156 are then engaged to threads of bolt member 128. Nut 156 is then tightened onto bolt member 128 such other washer 144 engages first end 140 of wall 150 of sleeve 102 and head 130 of bolt member 128 engages a second end 142 of wall 150 of sleeve 102 causing a compressive force to be exerted onto sleeve 102. This compressive force causes outside surface 166 of sleeve 102 to exert a force against an interior wall 168 of hole 158 resulting in electrical conductive contacts being made with components 160 and 162. Further tightening of nut 156 continues the application of compressive force onto sleeve 102 so as to cause a portion 170 of the second end portion 106 of sleeve 102 to deform against head 130 of bolt member 128. Portion 170 occupies a chamfered section 171 defined in component 160 and positioned about hole 158 and adjacent first end 157 of hole 158, as seen in FIG. 4. This compressive force is similarly exerted on first end 140 of first end portion 104 of sleeve 102 in contact with other washer 144 causing at least a portion 172 of the first end portion 104 to deform At least a portion of deformed portion 172 of the first end portion 104 of sleeve 102 enters into the recess 122 of the washer 108.

As can be appreciated, the interference fit of fastener assembly 100 is implemented by compressive forces being applied to sleeve 102 causing an electrical contact being made with the interior wall 168 of hole 158 which comprises components 160 and 162 being joined together. Compressive force is continued to be applied by further tightening nut 156 until end portions 104 and 106 deform. This configuration permits the user to be able to use standardized bolt members and corresponding nuts since sleeve 102 is being compressed and not laterally expanded by a bolt member as in the prior art. Moreover, a greater tolerance with respect to the length of sleeve 102 is permitted with fastener assembly 100 since recess 122 of washer 108 has the capacity to take in a portion of first end portion 104 in the process of securing the fastener assembly 100. This greater tolerance for the length of sleeve 102 also reduces the dependency on washers to be used in taking up excess length of sleeve 102. Thus, with a greater tolerance to length of sleeve 102 being made available less varied lengths of sleeves 102 would be needed. Additionally, with use of fastener assembly 100, the fastener diameter will influence the diameter of the hole to be drilled or reamed in contrast to the prior art wherein the grip length influenced the diameter of the hole. As a result, fastener assembly 100 reduces the number varied sized holes to be drilled or reamed for fastening components together.

While various embodiments have been described above, this disclosure is not intended to be limited thereto. Variations can be made to the disclosed embodiments that are still within the scope of the appended claims.

What is claimed:
1. A fastener assembly, comprising
   a sleeve comprising a cylindrical construction having a first and second end portions and an outside diameter;
   a washer associated with the sleeve wherein the washer comprises a body which defines a first side and an opposing second side and defines an opening which extends from the first side toward the second side, wherein:
      the opening defines a diameter greater than the outside diameter of the sleeve, and
      the body defines a recess which has a diameter greater than the diameter of the opening and which extends from the second side toward the first side such that the recess and the opening are in communication with one another;
   another washer associated with the washer, wherein:
      the other washer comprises a body;

the body of the other washer defines an opening which extends through the other washer; and a diameter of the opening of the body of the other washer is smaller than the outside diameter of the sleeve and a bolt member comprising a head, a shaft and threads defined along at least a portion of the shaft, wherein with the shaft positioned within the sleeve, at least a portion of the threads extend from a first end of the sleeve.

2. The fastener assembly of claim 1 wherein the sleeve is constructed of a metal material.

3. The fastener assembly of claim 1 wherein the first side of the washer comprises a flat annular surface which surrounds the opening.

4. The fastener assembly of claim 3 wherein the opening increases in diameter as the opening extends from the first side toward the second side.

5. The fastener assembly of claim 4 wherein a sidewall of the opening forms a planar surface extending from the first side toward the second side.

6. The fastener assembly of claim 5 wherein the recess comprises another flat annular surface which surrounds the opening with which the recess communicates.

7. The fastener assembly of claim 6 wherein the sidewall of the opening intersects with the other flat annular surface which surrounds the opening.

8. The fastener assembly of claim 1 wherein a diameter of the recess is greater than the outside diameter of the cylinder.

9. The fastener assembly of claim 1 wherein the shaft comprises a diameter smaller than an inside diameter of the sleeve.

10. The fastener assembly of claim 9 wherein a transition portion of the shaft extends from the shaft to the head.

11. The fastener assembly of claim 10 wherein the transition portion of the shaft extends away from the shaft in a curved direction toward the head.

12. The fastener assembly of claim 1, wherein
the diameter of the opening-of the body of the other washer is greater than the diameter of the shaft of the bolt member, such that with the first end portion of the sleeve extending through the opening of the washer and into the recess of the washer, with the shaft of the bolt member extending through the opening of the other washer and with the washer positioned between the other washer and the head of the bolt member, at least a portion of the other washer aligns with a wall of the sleeve.

13. The fastener assembly of claim 12 wherein the body of the other washer defines flat annular surfaces surrounding the opening of the other washer positioned on opposing sides of the other washer and wherein an outside diameter of the other washer is greater than the diameter of the recess of the washer.

14. The fastener assembly of claim 12 further including a nut which defines threads compatible to the threads defined by the shaft of the bolt member such that the other washer is positioned between the washer and the nut with the threads defined by the nut engaged with the threads of the bolt member.

15. A method for using a fastener assembly, comprising the steps of:
inserting a first end portion of a sleeve, comprising a first and second end portions and an outside diameter, into and through a first end of a hole, wherein the hole is defined by at least two elements to be joined together and extends through the at least two elements such that a first end of the sleeve is positioned outside of a second end of the hole;

positioning a washer, wherein:
the washer comprises a body which defines a first side and an opposing second side and defines an opening which extends from the first side toward the second side;
the opening defines a diameter greater than the outside diameter of the sleeve;
the body defines a recess which extends from the second side toward the first side;
a diameter of the recess is greater than the diameter of the opening and
the recess and the opening are in communication with one another, such that the first end of the sleeve extends through the opening and the recess of the washer with the first end of the sleeve positioned outside of the recess with the recess facing in a direction toward the first end of the sleeve; and inserting a shaft of a bolt member into the sleeve wherein the bolt member comprises a head and an end portion of the shaft defines threads such that with positioning the head to abut the second end of the sleeve, at least a portion of the end portion of the shaft extends out from the first end of the sleeve; and positioning another washer, wherein:
the other washer comprises a body which defines an opening which extends through the other washer;
a diameter of the opening is greater than the diameter of the shaft of the bolt member such that the shaft of the bolt member extends through the opening of the other washer and the diameter of the opening is smaller than the outside diameter of the sleeve.

16. The method of claim 15 further including selecting the sleeve to include an outside diameter smaller than the hole and a length which exceeds a length of the hole.

17. The method of claim 15 wherein the step of inserting a shaft of a bolt member into the sleeve includes the shaft of the bolt member having an outside diameter smaller than an interior diameter of the sleeve.

18. The method of claim 17 wherein the step of positioning another washer further includes with the shaft of the bolt member extending through the opening of the other washer, with the washer positioned between the other washer and the head of the bolt member, whereby at least a portion of the other washer aligns with a wall of the sleeve.

19. The method of claim 18 further including a step of engaging threads defined by a nut with the threads defined by the end portion of the shaft of the bolt member.

20. The method of claim 19 further including a step of tightening the nut onto the bolt member such that the other washer engages the first end of the sleeve and the head of the bolt member engages a second end of the sleeve causing a compressive force to be exerted onto the sleeve causing an outside surface of the sleeve to exert a force against an interior wall of the hole, and with continued application of compressive force onto the sleeve, the second end portion of the sleeve deforms with the head of the bolt member exerting a compressive force onto the second end of the sleeve and the first end portion of the sleeve deforms with the other washer exerting a compressive force onto the first end of the sleeve such that at least a portion of the first end portion of the deformed sleeve enters the recess of the washer.

* * * * *

UNITED STATES PATENT AND TRADEMARK OFFICE
CERTIFICATE OF CORRECTION

PATENT NO. : 9,714,676 B2
APPLICATION NO. : 14/454161
DATED : July 25, 2017
INVENTOR(S) : Gerfried R. Achtner et al.

Page 1 of 1

It is certified that error appears in the above-identified patent and that said Letters Patent is hereby corrected as shown below:

In the Claims

At Column 7, Line 5, "sleeve and" should be -- sleeve; and --.

At Column 7, Line 39, "opening-of" should be -- opening of --.

At Column 8, Line 14, "opening and" should be -- opening; and --.

Signed and Sealed this
Sixteenth Day of January, 2018

Joseph Matal
*Performing the Functions and Duties of the
Under Secretary of Commerce for Intellectual Property and
Director of the United States Patent and Trademark Office*